(12) United States Patent
Lin et al.

(10) Patent No.: US 7,151,731 B2
(45) Date of Patent: Dec. 19, 2006

(54) METHOD FOR CONTROLLING ROTATION SPEED OF AN OPTICAL STORAGE DEVICE

(75) Inventors: Wan-Perng Lin, Taipei (TW); Yu-Wei Ling, Kao-Hsiung (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 363 days.

(21) Appl. No.: 10/710,858

(22) Filed: Aug. 8, 2004

(65) Prior Publication Data

US 2005/0041547 A1    Feb. 24, 2005

(30) Foreign Application Priority Data

Aug. 18, 2003    (TW) .............................. 92122665 A (51) Int. Cl.
G11B 15/46    (2006.01)

(52) U.S. Cl. ................... 369/53.3; 369/47.38
(58) Field of Classification Search ............... None
See application file for complete search history.

(56) References Cited

U.S. PATENT DOCUMENTS

| | | | | |
|---|---|---|---|---|
| 5,724,328 A | * | 3/1998 | Yanagi | 369/47.52 |
| 5,764,430 A | * | 6/1998 | Ottesen et al. | 360/73.03 |
| 6,088,315 A | * | 7/2000 | Ando | 369/47.41 |
| 6,493,300 B1 | * | 12/2002 | Failer | 369/53.12 |
| 6,631,105 B1 | * | 10/2003 | Fukuda et al. | 369/47.44 |
| 2003/0235408 A1 | * | 12/2003 | Silvester et al. | 386/126 |
| 2006/0044963 A1 | * | 3/2006 | Takahashi | 369/47.36 |

* cited by examiner

Primary Examiner—Thang V. Tran
(74) Attorney, Agent, or Firm—Winston Hsu (57) ABSTRACT

A method of rotation speed control for optical storage device is proposed. The method adjusts the rotation speed of an optical storage device to increase access probability and also enhance performance of the optical storage device. The method includes providing weighted values corresponding to a plurality of events that may happen during reading or writing processes of the optical storage device, providing an evaluation function, and determining a speed-up threshold and a speed-down threshold, which correspond to each rotation speed value, within a range of evaluation function values. Further included are when an event of the plurality of events happens, changing the evaluation function value according to the weighted value of the event, and when the evaluation function value is not within an domain between the thresholds, selectively changing the rotation speed of the optical storage device. The method further includes adaptively adjusting the thresholds and the weighted values.

20 Claims, 5 Drawing Sheets

METHOD FOR CONTROLLING ROTATION SPEED OF AN OPTICAL STORAGE DEVICE

BACKGROUND

The present invention generally relates to a method for controlling optical storage devices, and more particularly, to a method for controlling rotation speed of an optical storage device.

Following the increase in calculation speed of central processing units (CPUs) and networks, the requirement for data storage of different computer users increases accordingly Due to the advantages including compact size, high storage volume, and economical cost of an optical storage medium such as a compact disc (CD) or a digital versatile disc (DVD), the corresponding optical storage device such as a CD drive, a CD burner, a DVD drive, or a DVD burner for accessing (ex. writing or reading) the above-mentioned optical storage medium have become a standard component in computer systems.

The access speed of data on the optical storage medium corresponds to the rotation speed of the optical storage medium driven by the optical storage device and also depends on the quality of the optical storage medium and the optical storage device. Due to the large amount of variations affecting the correlation between the access rate and the rotation speed, the conventional optical storage device is unable to sustain high data access rate under high rotation speed of the optical storage medium driven by the optical storage device. In other words, the conventional optical storage device cannot maintain the optimized rotation speed because it cannot accurately access data within the predetermined rotation speed which increases the data access time of the optical storage device and adversely affects the completion of the data access that consequently causes inconvenience for the users.

SUMMARY

It is therefore an objective of the claimed invention to provide a method for controlling a rotation speed of an optical storage device to solve the above-mentioned problem.

According to the claimed invention, one embodiment of the present invention provides a method for controlling a rotation speed of an optical storage device to increase the data access rate of the optical storage device accessing an loaded optical storage medium, the method includes: defining a plurality of events that will probably happen during writing or reading processes of the optical storage device; providing a weighted value corresponding to each of the plurality of events; providing an evaluation function; determining an initial value for the evaluation function, and a speed-up threshold and a speed-down threshold within the domain of the evaluation function, wherein the speed-up threshold and speed-down threshold divide the domain the evaluation function into a speed-up domain, a domination space, and a speed-down domain; when one of the plurality of events happens, changing the value of the evaluation function according to the weighted value of the event; selectively increasing the rotation speed of the optical storage device when the value of the evaluation function lies in the speed-up domain; and selectively decreasing the rotation speed of the optical storage device when the value of the evaluation function lies in the speed-down domain.

The embodiment of the present invention also provides a method for controlling a rotation speed of an optical storage device to increase the data access rate of the optical storage device accessing an loaded optical storage medium, the method including: defining a plurality of events that will probably happen during writing or reading processes of the optical storage device; providing an evaluation function; for the evaluation function, determining an initial value corresponding to each rotation speed value of a plurality of rotation speed values of the optical storage device, and within the domain of the evaluation function, determining a speed-up threshold and a speed-down threshold both corresponding to each rotation speed value of the plurality of rotation speed values, wherein the speed-up threshold and the speed-down threshold divide the domain of the evaluation function into a speed-up domain, a domination space, and a speed-down domain; when one of the plurality of events happens, adjusting a speed-up threshold or a speed-down threshold corresponding to a rotation speed value of the plurality of rotation speed values according to the event to change the size of a dominance space corresponding to the rotation speed value; and selectively changing the rotation speed of the optical storage device according to the size of a domination space corresponding to a current rotation speed value of the plurality of rotation speed values and according to the size of a domination space corresponding to a target rotation speed value of the plurality of rotation speed values.

One of the advantages of the present invention is that the method can adjust correlation between the rotation speed deviation and rotation speed adjustment by a weighing system. The correlation is adaptively learnt to increase the data access rate of the optical storage device accessing the loaded optical storage medium. Therefore, it is achieved to prevent the related art problem of constantly leveling the rotation speed value due to the disability of maintaining a balanced relationship of the data access rate and the rotation speed, and prevent the corresponding problem that a computer system accessing the optical storage device may lose control over the optical storage device. As a result, the present invention improves the convenience to the users.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
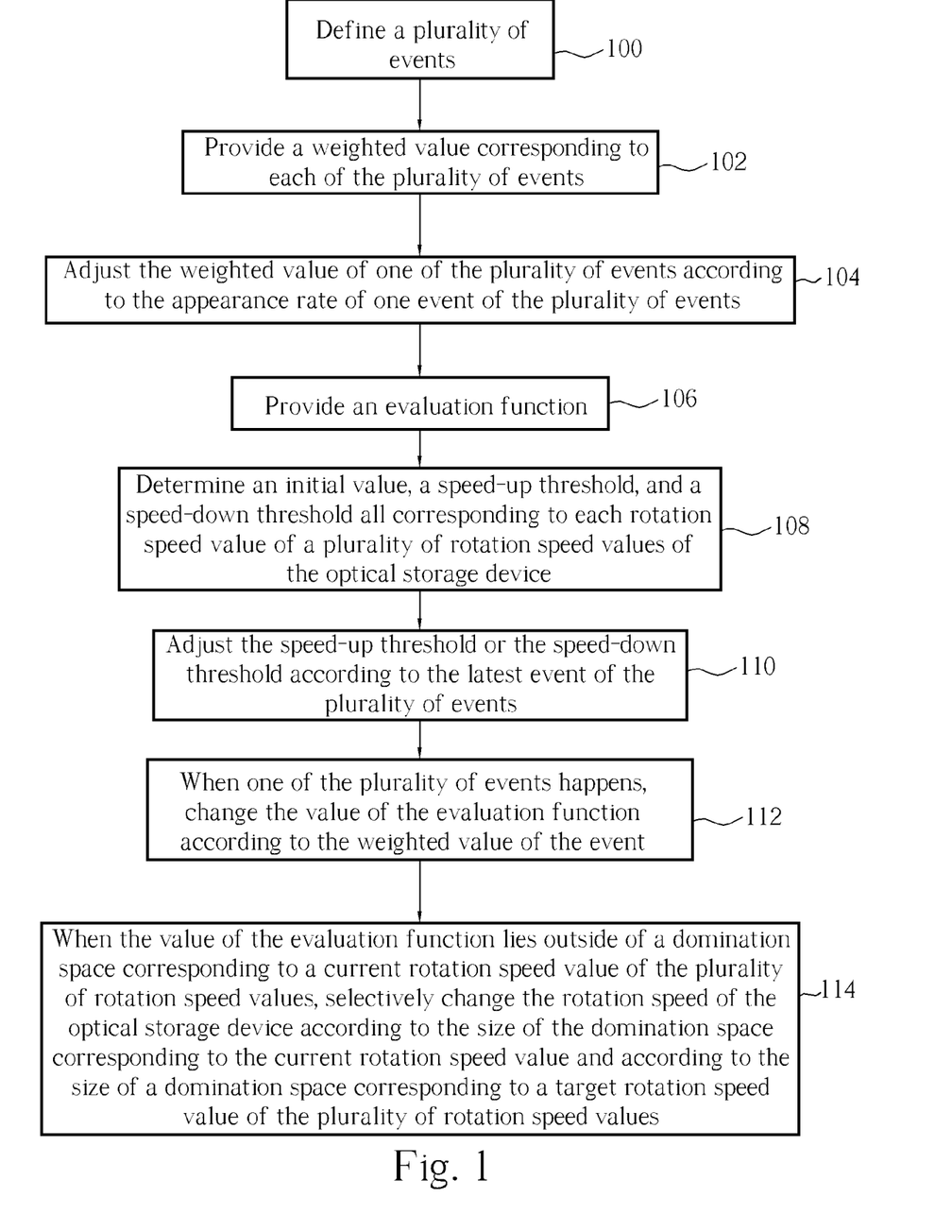
FIG. 1 is a flow chart of the method for controlling a rotation speed of an optical storage device according to one embodiment of the present invention.
Figure 2:
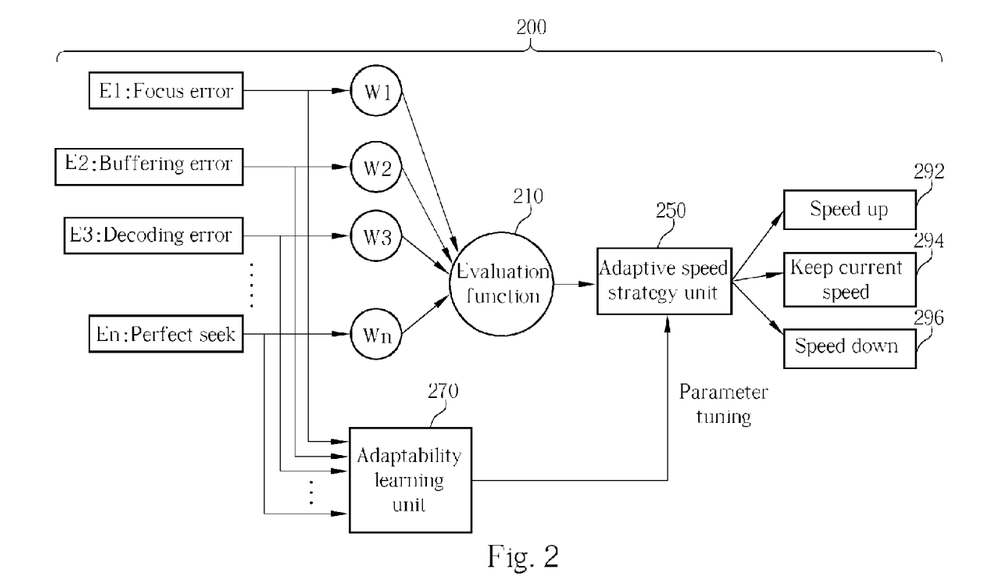
FIG. 2 is a diagram of a model for performing the method shown in FIG. 1.

Please refer to both FIG. 1 and FIG. 2. FIG. 1 is a flow chart of the method for controlling a rotation speed of an optical storage device and FIG. 2 is a schematic diagram of a model for performing the method of FIG. 1. One preferred embodiment of the present invention provides a rotation speed control method relating to the optical storage device. The method adjusts the rotation speed of the optical storage device to increase the data access rate, or the data access probability, of the optical storage device accessing (ex. reading or writing) a loaded optical storage medium. The order of the following steps does not limit the scope of the present invention and the method is described as follows.

Step 100: Define a plurality of events E1, E2, E3, . . . En (shown in FIG. 2) that will probably happen during writing or reading processes of the optical storage device.

Step 102: Provide a weighted value W1, W2, W3, . . . , or Wn corresponding to each of the plurality of events E1, E2, E3, . . . En to divide the plurality of events E1, E2, E3, . . . En into positive events and negative events respectively corresponding to positive and negative ones of the weighted values E1, E2, E3, . . . En.

Step 104: Adjust the weighted value of one of the plurality of events E1, E2, E3, . . . En according to the appearance rate of one event of the plurality of events E1, E2, E3, . . . En.

Step 106: Provide an evaluation function 210.

Step 108: For the evaluation function 210, determine an initial value corresponding to each rotation speed value of a plurality of rotation speed values of the optical storage device. And within the domain of the evaluation function 210, determine a speed-up threshold and a speed-down threshold, which are stored in the adaptive speed strategy unit 250 shown in FIG. 2, both corresponding to each rotation speed value of the plurality of rotation speed values, wherein the speed-up threshold and the speed-down threshold divide the domain of the evaluation function into a speed-up domain, a domination space, and a speed-down domain, and the initial values, the speed-up threshold, and speed-down threshold correspond to the above-mentioned each rotation speed value.

Step 110: Adjust the speed-up threshold or speed-down threshold according to the latest event of the plurality of events. That is, perform parameter adjustment of the adaptive speed strategy unit 250 with the adaptive learning unit 270 in FIG. 2 in this embodiment.

Step 112: When one of the plurality of events happens, change the value of the evaluation function 210 according to the weighted value of the event. That is, in this embodiment, accumulate the weighted value into the evaluation function so the evaluation function is a variable function with respect to the time axis.

Step 114: When the value of the evaluation function lies outside of a domination space corresponding to a current rotation speed value of the plurality of rotation speed values, selectively change the rotation speed of the optical storage device according to the size of the domination space corresponding to the current rotation speed value and according to the size of a domination space corresponding to a target rotation speed value of the plurality of rotation speed values. That is, use the adaptive speed strategy unit 250 to perform a comparison on the size of the above-mentioned domination spaces and to choose one of the strategies: "increase speed" 292, "keep current speed" 294, or "decrease speed" 296, and optimize the rotation speed according to the chosen strategy in this embodiment.

In step 108, when the optical storage device starts operating at a certain rotation speed, the value of the evaluation function is reset to the initial value corresponding to the rotation speed value employed. In the preferred embodiment of the present invention, the initial value is the average of the speed-up threshold and speed-down threshold which also represents the middle point of the domination space. Therefore, the initial value, speed-up threshold, and speed-down threshold all correspond to the rotation speed value. That is, for every rotation speed value there is a corresponding set of initial value, speedup threshold, and speed-down threshold. In steps 108 and 110, the size, namely width in the one-dimensional case in this embodiment, of the domination space corresponds to the speed-up threshold or the speed-down threshold, and the events that happen under the rotation speed value indicate if the rotation speed is appropriate for performing certain operations. When one of the plurality of events happens, the adaptability learning unit 270 in FIG. 2 adjusts the memorized parameters in the adaptive speed strategy unit 250 in FIG. 2 according to the happened event. That is, when one of the plurality of events happens, the adaptability learning unit 270 in FIG. 2 can adjust the speed-up threshold or the speed-down threshold corresponding to a current rotation speed value of the plurality of rotation speed values to change the size of the domination space corresponding to the current rotation speed value. In the above-mentioned parameter tuning process, the adaptability learning unit 270 can adjust the speed-up threshold or the speed-down threshold corresponding to a neighboring rotation speed value of the plurality of rotation speed values to change the size of the domination space corresponding to the neighboring rotation speed value. The following describes the possible events in details of the present invention.

When a positive event such as "Perfect Seek" or "Prefect Access" happens, it is indicated that a current rotation speed value, the value employed as the current rotation speed, of the optical storage device is very suitable for performing data access and operation of the like. The higher the appearance rate of these positive events means the current rotation speed value of the optical storage device facilitates a more stable operation and higher data access rate and therefore this rotation speed should be used more often for all kinds of operations. The size of the domination space corresponding to the current rotation speed value should be enlarged to allow more chances, the chances of being used, than those for other rotation speeds. Similarly, when a negative event such as "Decoding Error", "Focus Error", "Seek Error", or the like happens, it is indicated that a current rotation speed value, the value employed as the current rotation speed, of the optical storage device is unsuitable for performing data access and operation of the like. The higher the appearance rate of these negative events means the current rotation speed value of the optical storage device does not facilitate a more stable operation and higher data access rate and therefore this rotation speed should not be used too often for all kinds of operations. The size of the domination space corresponding to the current rotation speed value should be compressed to allow less chances, the chances of being used, than those for other rotation speeds.

Using Step 102 to assign discreet and various values of the weighted values W1, W2, W3, . . . , Wn and using step 112 to accumulate the weighted values according to each event into the evaluation function 210 in FIG. 2, one may find the relationship between the data access rate and the rotation speed of the optical storage device under different events and find that different weighted values denote different degree of influence of the events. For example, the weighted value W1 of "Focus Error" is "−20", the weighted value W2 of "Buffering Error" is "−5", and the weighted value W3 of "Decoding Error" is "−5". Wherein the negative weight values W1, W2, and W3 represent the negative events, the higher absolute value of W1 compared to W2 and W3 means that the seriousness of the "Focus Error" is higher than "Buffering Error" and "Decoding Error". When "Focus Error" occurs, the value of the evaluation function has larger tendency to enter the speed-down domain, therefore "Focus Error" has a greater effect of encouragement on slowing-down the rotation speed of the optical storage device than "Buffering Error" and "Decoding Error". And the target rotation speed value in step 114 can be defined as the rotation speed of a level lower than the current rotation speed. Therefore the method of the present invention further includes selectively decreasing the rotation speed of the optical storage device when the value of the evaluation function lies in the speed-down domain. That is, use the adaptive speed strategy unit 250 to choose one of the strategies: "keep current speed" 294 or "decrease speed" 296, and optimize the rotation speed according to the chosen strategy in this embodiment. The action of step 114 is selective because of two execute requirements: first, the evaluation function's value corresponding to the current rotation speed value lies outside of the domination space corresponding to the current rotation speed value; second, the result of a size comparison of the domination spaces respectively corresponding to the current rotation speed value and the target rotation speed value, may forbid executing. That is, step 114 cannot be executed solely based on one execution requirement. In this embodiment, if the size of the domination space corresponding to the current rotation speed value is larger than the size of the domination space corresponding to the target rotation speed value, the adaptive speed strategy unit 250 will choose the keep current speed strategy 294. Furthermore in step 114, whenever the adaptive speed strategy unit 250 chooses the keep current speed strategy 294 in FIG. 2, the value of the evaluation function can be minutely adjusted to maintain within the domination space to prevent the optical storage device constantly switching between the current rotation speed value, which is a more adapted rotation speed value, and the target rotation speed value, which is a less adapted rotation speed value.

For positive events such as "Perfect Seek" and "Perfect Access", the corresponding weighted values Wn and W6 are "10" and "1", wherein the weighted values W6 and Wn being positive represent positive events. As the absolute value of Wn is greater than the absolute value of W6, the affect of the "Perfect Seek" event on the relationship between the data access rate and the rotation speed of the optical storage device is greater than that of "Perfect Access" event. Therefore the "Perfect Seek" event has more encouragement in increasing the rotation speed of the optical storage device than the "Perfect Access" event. In step 114, the target rotation speed value can be set as a level slightly higher than the current rotation speed value. Therefore the method of the present invention further includes selectively increasing the rotation speed of the optical storage device when the value of the evaluation function lies in the speed-up domain. That is, use the adaptive speed strategy unit 250 to choose one of the strategies: "increase speed" 292 or "keep current speed" 294, and optimize the rotation speed according to the chosen strategy in this embodiment.

Figure 3:
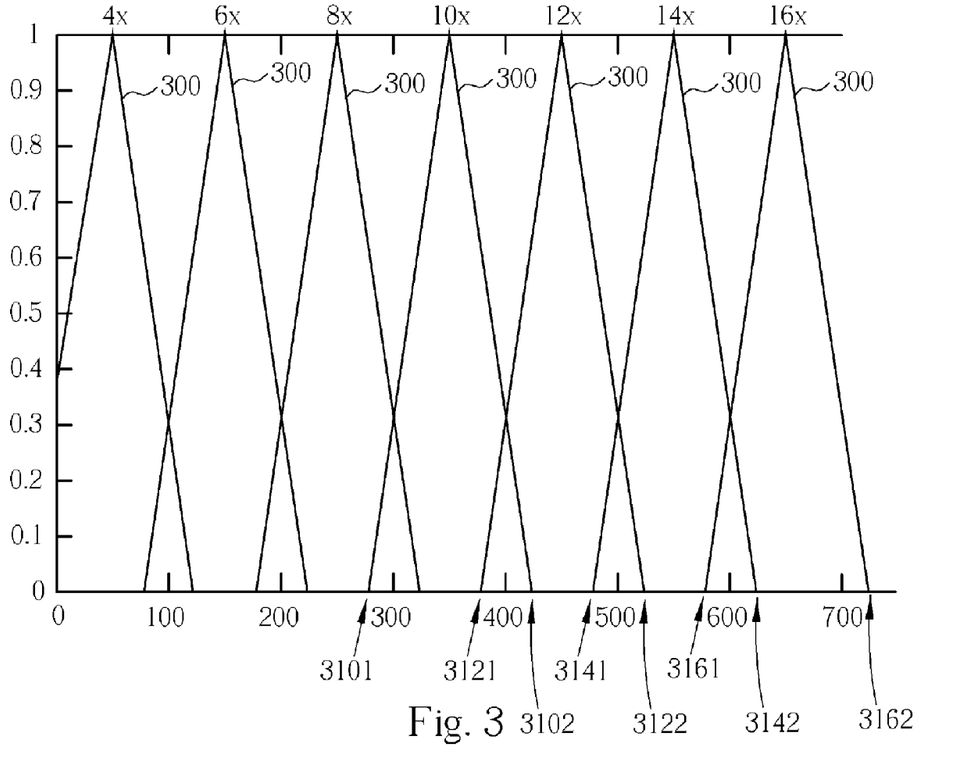
FIG. 3 is a schematic diagram of the adaptive functions of the adaptive speed strategy unit in FIG. 2.

Please refer to FIG. 3, which is a schematic diagram of the adaptive functions 300 of the adaptive speed strategy unit 250 in FIG. 2. The adaptive functions 300, which have multiple function values respectively corresponding to the rotation speed values 4×, 6×, 8×, 10×, 12×, 14×, and 16×, includes a series of curves 300 corresponding to the rotation speed values 4×, 6×, 8×, 10×, 12×, 14×, and 16×. The horizontal axis represents the value of the evaluation function and the vertical axis represents the value of the adaptive function 300 corresponding to each rotation speed value such as 4×, 6×, 8×, 10×, 12×, 14×, or 16× shown in FIG. 3. The intersections of the curve corresponding to one of the rotation speed values and the horizontal axis denote a corresponding set of speed-up threshold and speed-down threshold. For example, the speed-down threshold 3121 and the speed-up threshold 3122 both corresponding to the rotation speed value 12× respectively locate at the intersections where the curve representing the rotation speed value 12× intersects the horizontal axis. To the left of the speed-down threshold 3121 and to the right of the speed-up threshold 3122, the curve overlaps with the horizontal axis so the adaptive function corresponding to the speed-down and speed-up domains of the rotation speed value 12× is zero. Therefore, the series of curves of the adaptive functions 300 may represent the adaptability of the optical storage device to different rotation speed values, wherein the area bounded by each curve is the adaptability and a larger area indicates higher adaptability. Before adaptive learning is performed, the size of the domination space of every rotation speed value in FIG. 3 is equal. Please refer to FIG. 4, which shows the learning results of the adaptive functions 300 in FIG. 3. After the adaptive speed strategy unit 250 performs adaptive learning, the domination spaces corresponding to the rotation speed values 10× and 12× are increased so the optical storage device can frequently utilize the rotation speeds 10× and 12× to perform various operations. It is obvious that the abovementioned domination spaces corresponding to the rotation speed values 10× and 12× are shown as the domination space between the thresholds 3101 and 3102 and the domination space between the thresholds 3121 and 3122 respectively. On the other hand, the domination spaces corresponding to the rotation speed values 14× and 16× are decreased so the optical storage device has less chances of using rotation speed values 14× and 16× to perform operations. It is also obvious that the abovementioned domination spaces corresponding to the rotation speed values 14× and 16× are shown as the domination space between the thresholds 3141 and 3142 and the domination space between the thresholds 3161 and 3162 respectively.

Figure 4:
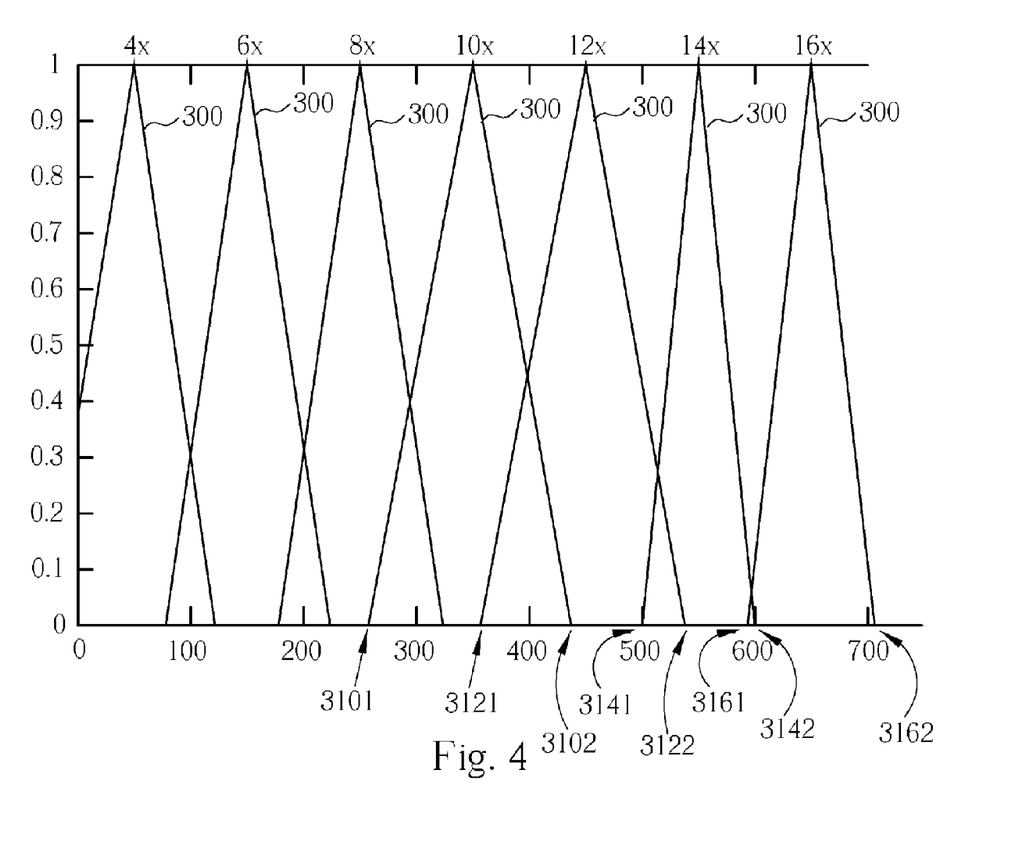
FIG. 4 shows the learning results of the adaptive functions in FIG. 3.

In step 114, the adaptive speed strategy unit 250 performs the size comparison of the domination spaces respectively corresponding to the current rotation speed value and the target rotation speed value. Therefore, whether the current rotation speed value or the target rotation speed value is more suitable for performing various operations can be determined. Using the current rotation speed 12× as an example, the evaluation function after a "Prefect Access" event is greater than the speed-up threshold 3122 so the adaptive speed strategy unit 250 in FIG. 2 chooses the keep current speed strategy 294 because the learning results in FIG. 4 shows that the domination space corresponding to the rotation speed value 14× is smaller than the domination space corresponding to the rotation speed value 12×. At the same time, the adaptive speed strategy unit 250 can increase the speedup threshold 3122 and the speed-down threshold 3141 and decrease the speed-down threshold 3121 and the speed-up threshold 3142 to relatively increase the chances of using the rotation speed value 12× instead of the rotation speed value 14×.

Figure 5:
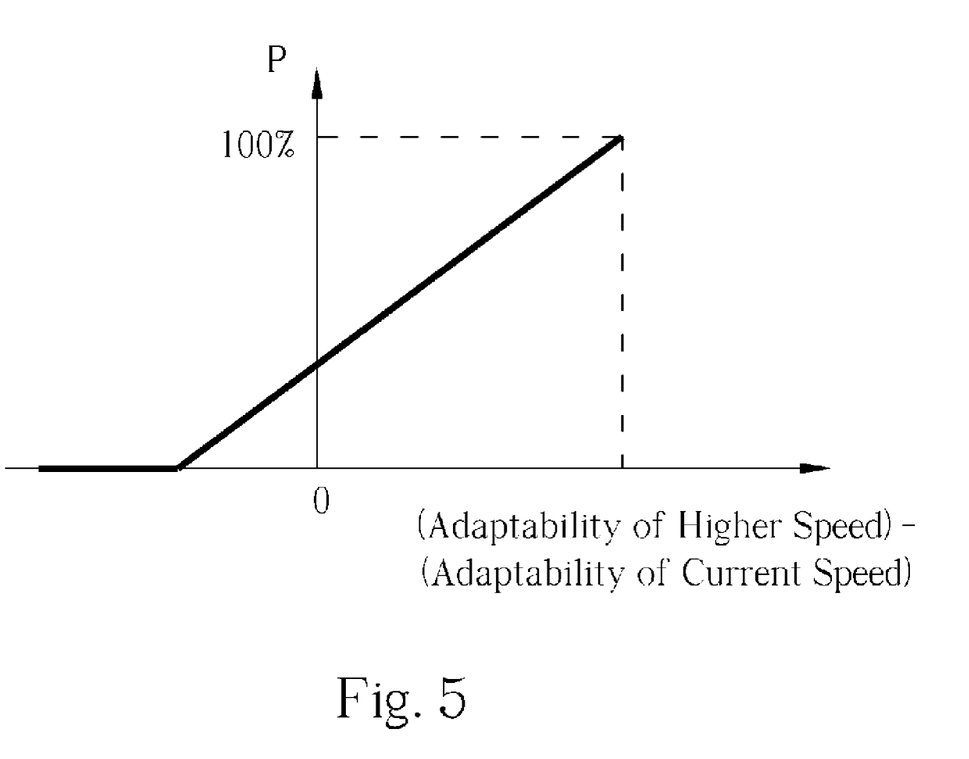
FIG. 5 is a schematic diagram of the speed-up probability function of the adaptive speed strategy unit in FIG. 2.

Please refer to FIG. 5, which is schematic diagram of the speed-up probability function of the adaptive speed strategy unit 250 in FIG. 2. The horizontal axis, which is labeled as "Adaptability of Higher Speed" minus "Adaptability of Current Speed", substantially denotes the difference value calculated by subtracting the size of the domination space corresponding to the current rotation speed value from the size of the domination space corresponding to the target rotation speed value, which is a higher rotation speed value compared with the current rotation speed value. The vertical axis denotes the probability of choosing the speed-up strategy 292 by the adaptive speed strategy unit 250, and the above-mentioned probability is derived from plugging in the above-mentioned difference value into the speed-up probability function of the adaptive speed strategy unit 250 shown in FIG. 5. When the probability is 1 (i.e. 100%), the optical storage device must increase its rotation speed. Then, it is determined by the random procedures whether increasing speed is necessary. Using random procedures improves the learning effect of the adaptive speed strategy unit 250 to allow each rotation speed value to be available for further use under any learning result and to retain an adequate number of trials of each rotation speed value so that realistic learning results can be achieved. Furthermore, testing different rotation speed values during the training using the random procedures can prevent some target rotation speed values from being unavailable due to some initially happened negative events objecting to these target rotation speed values, and prevent other rotation speed values next to these target rotation speed values from being unavailable as well. In another embodiment of the present invention, FIG. 4 shows the initial learning results of the adaptive speed learning strategy unit 250, wherein the current rotation speed value is 12× and the target rotation speed value is 14×. The domination space between the thresholds 3141 and 3142 is smaller than the domination space between the thresholds 3121 and 3122. That is, the domination space corresponding to the rotation speed 14× is smaller than the domination space corresponding to the rotation speed 12×. This situation will prevent the rotation speed value 14× from being used if the adaptive speed strategy unit 250 has no opportunity of trials of the rotation speed value 14× initially. Through the random procedures, the adaptive speed strategy unit 250 has the opportunity to be trained for the related parameters of the rotation speed value 14× and the neighboring rotation speed values 12× and 16×, wherein the related parameters are the thresholds 3141 and 3142, the thresholds 3121 and 3122, and the thresholds 3161 and 3162 respectively. As mentioned above, the events happening under the current rotation speed value will also affect the related parameters of the neighboring rotation speed values. The random procedures also prevents the adaptive speed strategy unit 250 from being blocked from entering the rotation speed value 14×, together with the rotation speed value 16×.

Please refer to FIG. 4 again. In the preferred embodiment, each adaptive function 300 is formed with two tilted straight lines within the corresponding dominance space, and the adaptability of the optical storage device with respect to the rotation speed values is shown in the learning results of the adaptive functions 300 in FIG. 4. Therefore, both the size comparison of the domination spaces and the function value comparison of the adaptive functions 300 show the adaptability of the rotation speed values. In another embodiment of the present invention, the adaptive speed strategy unit 250 can liberally substitute the value of the evaluation function into any of the adaptive functions 300 in FIG. 4 to obtain the adaptive function value of the adaptive function 300 corresponding to any curve. After a maximum of the adaptive function values is determined, the corresponding rotation speed value to which the maximum corresponds is used as the target rotation speed value. For example, if the target rotation speed value to which the maximum corresponds is slightly larger than the current rotation speed value, the adaptive speed strategy unit 250 may substitute the difference value calculated by subtracting the adaptive function's value corresponding to the current rotation speed value from the largest value into the speed-up probability function in FIG. 5 by random procedures to determine if changing the rotation speed value is required. As a result, it is not necessary as in step 114 to wait until the value of the evaluation function lies outside of the domination space corresponding to one current rotation speed value of the plurality of rotation speed values to determine if changing the rotation speed value is required. That is, it is not necessary as in step 114 to wait until the value of the evaluation function lies in either the speed-up domain or the speed-down domain corresponding to one current rotation speed value of the plurality of rotation speed values to determine if changing the rotation speed value is required.

Summarizing the above-mentioned another embodiment, the method of the present invention further includes: defining an adaptive function 300 corresponding to each rotation speed value of the plurality of rotation speed values 4×, 6×, 8×, 10×, 12×, 14×, and 16×, wherein the adaptive function 300, which corresponds to one of the curves 300 in FIG. 2, corresponds to the speed-up threshold and the speed-down threshold both corresponding to the rotation speed value. The method of the present invention further includes: substituting the value of the evaluation function into a plurality of adaptive functions of the adaptive functions respectively to determine a maximum of values of the plurality of adaptive functions; and determining whether the rotation speed of the optical storage device should be changed into a different rotation speed value to which the maximum corresponds by random procedures.

According to the random access results of the present invention, it can effectively reduce the number of seek errors. As another index of the access performance of the optical storage device, the data transfer rate can be stably maintained at high speed according to the present invention.

The above-mentioned evaluation functions can cater the difference in optical medium such as disc variety and coding of data access. Therefore, the method of the present invention further includes providing the evaluation function corresponding to the optical storage medium, wherein the initial values, the speed-up thresholds, and the speed-down thresholds correspond to the optical storage medium. The method further includes memorizing the adjusted ones of the speed-up thresholds and the speed-down thresholds before the optical storage medium is unloaded from the optical storage device, wherein the memorized information is useful when an identical optical medium is used on the optical storage device. In another embodiment of the present invention, a plurality of weighted values of the weighted values can be equal. When all the weighted values are identical, the evaluation function 210 in FIG. 2 can be replaced with at least one counter. Furthermore, the optical storage device of the present invention can be a CD drive, a CD burner, a DVD drive, or a DVD burner.

One of the advantages of the present invention is that the method can adjust correlation between the rotation speed deviation and rotation speed adjustment by a weighing system. The correlation is adaptively learnt so to increase the data access rate of the optical storage device accessing the loaded optical storage medium. Therefore, it is achieved to prevent the related art problem of constantly leveling the rotation speed value due to the disability of maintaining a balanced relationship of the data access rate and the rotation speed, and prevent the corresponding problem that a computer system accessing the optical storage device may lose control over the optical storage device. As a result, the present invention improves the convenience to the users.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. A method for controlling the rotation speed of an optical storage device to increase the data access rate of the optical storage device accessing an loaded optical storage medium, the method comprising:

defining a plurality of events that will probably happen during writing or reading processes of the optical storage device;

providing a weighted value corresponding to each of the plurality of events;

providing an evaluation function;

determining an initial value for the evaluation function, and a speed-up threshold and a speed-down threshold within the domain of the evaluation function, wherein the speed-up threshold and speed-down threshold divide the domain the evaluation function into a speed-up domain, a domination space, and a speed-down domain;

when one of the plurality of events happens, changing the value of the evaluation function according to the weighted value of the event;

selectively increasing the rotation speed of the optical storage device when the value of the evaluation function lies in the speed-up domain; and selectively decreasing the rotation speed of the optical storage device when the value of the evaluation function lies in the speed-down domain.

2. The method of claim 1 further comprising:

for the evaluation function, determine the initial value, the speed-up threshold, and speed-down threshold, all corresponding to each rotation speed value of a plurality of rotation speed values of the optical storage device.

3. The method of claim 2 further comprising:

When the value of the evaluation function lies outside of a domination space corresponding to a current rotation speed value of the plurality of rotation speed values, selectively change the rotation speed of the optical storage device according to the size of the domination space corresponding to the current rotation speed value and according to the size of a domination space corresponding to a target rotation speed value of the plurality of rotation speed values.

4. The method of claim 2 further comprising:

defining an adaptive function corresponding to each rotation speed value of the plurality of rotation speed values, wherein the adaptive function corresponds to the speed-up threshold and the speed-down threshold both corresponding to the rotation speed value;

substituting the value of the evaluation function into a plurality of adaptive functions of the adaptive functions respectively to determine a maximum of values of the plurality of adaptive functions; and determining whether the rotation speed of the optical storage device should be changed into a different rotation speed value to which the maximum corresponds by random procedures.

5. The method of claim 1 further comprising:

providing the evaluation function corresponding to the optical storage medium, wherein the initial value, the speed-up threshold, and the speed-down threshold of the evaluation function correspond to the optical storage medium.

6. The method of claim 1 further comprising:

Adjusting the speed-up threshold or speed-down threshold according to the latest event of the plurality of events.

7. The method of claim 6 further comprising:

memorizing the adjusted speed-up threshold and the adjusted speed-down threshold before the optical storage medium is unloaded from the optical storage device.

8. The method of claim 1 further comprising:

adjusting the weighted value of one of the plurality of events according to the appearance rate of one event of the plurality of events.

9. The method of claim 1, wherein a plurality of weighted values of the weighted values can be equal.

10. The method of claim 1, wherein the optical storage device is a CD drive or a CD burner.

11. The method of claim 1, wherein the optical storage device is a DVD drive or a DVD burner.

12. A method for controlling the rotation speed of an optical storage device to increase the data access rate of the optical storage device accessing an loaded optical storage medium, the method comprising:

defining a plurality of events that will probably happen during writing or reading processes of the optical storage device;

providing an evaluation function;

for the evaluation function, determining an initial value corresponding to each rotation speed value of a plurality of rotation speed values of the optical storage device, and within the domain of the evaluation function, determining a speed-up threshold and a speed-down threshold both corresponding to each rotation speed value of the plurality of rotation speed values, wherein the speed-up threshold and the speed-down threshold divide the domain of the evaluation function into a speed-up domain, a domination space, and a speed-down domain;

when one of the plurality of events happens, adjusting a speed-up threshold or a speed-down threshold corresponding to a rotation speed value of the plurality of rotation speed values according to the event to change the size of a dominance space corresponding to the rotation speed value; and selectively changing the rotation speed of the optical storage device according to the size of a domination space corresponding to a current rotation speed value of the plurality of rotation speed values and according to the size of a domination space corresponding to a target rotation speed value of the plurality of rotation speed values.

13. The method of claim 12 further comprising:

providing a weighted value corresponding to each of the plurality of events to divide the plurality of events into positive events and negative events respectively corresponding to positive and negative ones of the weighted values;

when one of the plurality of events happens, changing the value of the evaluation function according to the weighted value of the event;

selectively increasing the rotation speed of the optical storage device when the value of the evaluation function lies in the speed-up domain; and selectively decreasing the rotation speed of the optical storage device when the value of the evaluation function lies in the speed-down domain.

14. The method of claim 13 further comprising:
adjusting the weighted value of one of the plurality of events according to the appearance rate of one event of the plurality of events.

15. The method of claim 13, wherein a plurality of weighted values of the weighted values can be equal.

16. The method of claim 12 further comprising:
defining an adaptive function corresponding to each rotation speed value of the plurality of rotation speed values, wherein the adaptive function corresponds to the speed-up threshold and the speed-down threshold both corresponding to the rotation speed value;
substituting the value of the evaluation function into a plurality of adaptive functions of the adaptive functions respectively to determine a maximum of values of the plurality of adaptive functions; and
determining whether the rotation speed of the optical storage device should be changed into a different rotation speed value to which the maximum corresponds by random procedures.

17. The method of claim 12 further comprising:
providing the evaluation function corresponding to the optical storage medium, wherein the initial values, the speed-up thresholds, and the speed-down thresholds correspond to the optical storage medium.

18. The method of claim 12 further comprising:
memorizing the adjusted ones of the speed-up thresholds and the speed-down thresholds before the optical storage medium is unloaded from the optical storage device.

19. The method of claim 12, wherein the optical storage device is a CD drive or a CD burner.

20. The method of claim 12, wherein the optical storage device is a DVD drive or a DVD burner.

* * * * *